United States Patent [19]

Trethewey

[11] Patent Number: 5,706,763
[45] Date of Patent: Jan. 13, 1998

[54] RESTRAINING DEVICES

[75] Inventor: Reginald Trethewey, Deepwater, Australia

[73] Assignee: Rural Pacific Marketing PTY. LTD., Wakerley, Australia

[21] Appl. No.: 656,204

[22] PCT Filed: Dec. 13, 1994

[86] PCT No.: PCT/AU94/00770

§ 371 Date: Aug. 12, 1996

§ 102(e) Date: Aug. 12, 1996

[87] PCT Pub. No.: WO95/16342

PCT Pub. Date: Jun. 22, 1995

[30] Foreign Application Priority Data

Dec. 13, 1993 [AU] Australia .................. PM2907
Sep. 5, 1994 [AU] Australia .................. PM7880

[51] Int. Cl.$^6$ .................................................. A61D 3/00
[52] U.S. Cl. .................................................. 119/737
[58] Field of Search .................................. 119/734, 735, 119/736, 737

[56] References Cited

U.S. PATENT DOCUMENTS

| | | | |
|---|---|---|---|
| 2,678,631 | 5/1954 | Hagar | 119/737 |
| 3,245,383 | 4/1966 | Priefert | 119/737 |
| 4,632,063 | 12/1986 | Priefert | 119/737 |
| 5,109,802 | 5/1992 | Priefert | 119/737 |

*Primary Examiner*—Thomas Price
*Attorney, Agent, or Firm*—Dvorak & Orum

[57] ABSTRACT

A bail assembly including bail members moveable between operative engaged positions and a disengaged position; bail actuating structure for quickly moving the bail members between the operative engaged positions and the disengaged position, and holding devices for holding the bail members at any selected operative engaged position. Preferably the holding device is a selectively releasable self locking hydraulic cylinder assembly which includes adjustable holding device, a locking chamber associated with the adjustable holding device which may be filled to lock the adjustable holding device, control structure for controlling flow of fluid to and from the locking chamber, and actuating structure for selectively actuating the control structure.

19 Claims, 5 Drawing Sheets

RESTRAINING DEVICES

This invention relates to restraining devices and holding assemblies.

This invention has particular but not exclusive application to restraining devices such as head bails for animals and holding devices therefore and for illustrative purposes reference will be made hereinafter to such application. However it is to be understood that the restraining devices and holding assemblies of the present invention can be used independently of one another.

Presently utilised restraining devices such as head bails for cattle typically include moveable bails which are arranged to capture a beast by quickly clamping against opposite sides of a beasts neck, behind the ears. In this manner the beast is restrained before it can exit rearwardly from the bails which are maintained in their clamped position by a suitable holding assembly.

Generally the bails are actuated by a single action lever mechanism which affords a sufficiently high speed of operation to capture the beast's neck between the bails. The holding assembly is typically a ratchet and pawl mechanism which maintains the bails in the captured position against the neck of the beast. However, an optimum clamping force on the beast's neck cannot always be achieved because the rachet mechanism provides only a specific number of discrete holding positions and one of these positions must be engaged. Single action lever mechanisms are utilised as the speed of reversal of a beast generally does not permit performance of more than one operating action by an operator. Beasts which are not captured in the initial pass often become very difficult to handle.

Such rachet type holding assemblies are prone to wear rapidly as the rachet must be released whilst under load. Worn ratchet mechanisms can become liable to pawl slip and accordingly can be dangerous, allowing unexpected release of a secured beast.

Attempts have been made to overcome this problem, for example by the use of larger rachet teeth. However, when the size of the ratchet teeth is increased the number of discrete holding positions is reduced so that the beast cannot be restrained in the desired position.

In another attempt at reducing the danger of worn or wearing ratchet type holding assemblies the tooth cutback has been increased. However, the increased cutback makes the ratchet mechanism more difficult to release under load, thereby increasing the likelihood of damage to or loss of the beast as well as danger to the operator.

Ratchet type holding assemblies also create undesirable noise as the rachet pawl travels across the ratchet teeth as the head bail is being moved to the clamped position. Such noise may frighten the beast being clamped in the head bail and also those beasts in the race or holding yard awaiting treatment. This may result in greater difficulty in coaxing or encouraging the waiting beasts to enter the head bail.

Head bails are often makeshift as relatively poor bail performance can be tolerated provided there are adequate persons to control the beast to be bailed. However, many modern farmers have significantly reduced their labour forces and as a consequence they require good performance from their head bails. As such articles are bulky, their transport costs add significantly to the cost of supplying new head bails. Furthermore the addition of a modern head bail assembly to an existing race is often a practical mismatch leading to premature failure of the head bail assembly.

SUMMARY OF THE INVENTION

The present invention aims to alleviate at least one of the above disadvantages and to provide beast restraining apparatus which will be reliable and efficient in use.

This invention in one aspect resides broadly in a bail assembly including:
bail means moveable between operative engaged positions and a disengaged position;
bail actuating means for quickly moving said bail means between said operative engaged positions and said disengaged position, and
holding means for holding said bail means at any selected said operative engaged position. The holding means is suitably infinitely variable over at least the engaged positions of the bail means.

The bail means may include one fixed bail and one moveable bail but preferably it includes a pair of opposed moveable bails interconnected for movement towards and away from each other. The bail means may be arranged to move in any manner suitable for engaging a beast. For example the bails may be arranged for parallel sliding movement or pivotal movement. Preferably the bail means are arranged so that in a disengaged position the head of a beast may be passed through the gap between the bails and in an engaged position the bail means may clamp against the neck of the beast.

The bail actuating means may be an electrically operated device such as a motorised screw or solenoid operative to quickly move the bail means to and from the engaged position upon activation of a power supply. Preferably, however the bail actuating means is an operating handle operatively connected to the bail means so as to move the bail means to the engaged position upon movement of the handle in one direction.

The holding means may include a rod or rope operatively connected to the bail means and a clutch adapted to selectively clamp the rod or rope such that the bail means is held in a desired position. Alternatively, the holding means may include a rotary clutch with a pivotable handle allowing movement of the bail means to the engaged position but selectively preventing reverse movement of the restraining means to the disengaged position. Preferably however, the holding means is a hydraulically operated holding assembly which allows passage of hydraulic fluid such as water or oil from a fluid supply to a locking chamber as the bail means is moved to the engaged position and wherein the fluid is selectively prevented from flowing out of the locking chamber so as to hold the bail means in the engaged position.

It is preferred that the bail means includes a pair of bail members connected by concertina type hinges to opposed spaced supports. Suitably the bail members extend upwardly for engagement with guide means for guiding the bail members to and from engagement and wherein the guide members restrain only longitudinal movement of the bail members, lateral and vertical movement being controlled and restrained by the hinges.

In a preferred form the bail assembly is demountable for supply in knocked-down form and adapted for bolted interconnection of major structural components, especially those that provide additional rigidity to the race walls. It is also preferred that the members of the bail assembly, when disassembled, can be packed into a relatively small package. For this purpose it is preferred that the bail assembly include a pair of opposed support posts adapted to be rigidly interconnected by transverse members providing moment transfer about respective longitudinal race axes between support posts and post rotational support about post axes through bolted connections, each including bolts spaced from these respective axes. Preferably the moment transfer about respective longitudinal race axes is provided by a transverse structure at upper ends of the posts and the rotational support about post axes is provided by a transverse structure at the lower ends of the posts.

The upper transverse structure is suitably formed by spaced laterally extending bars which form guides for upward extension of the bail members. The rotational support about post axes fixes the posts against rotational movement such that hinge pivots fixed to the posts and spaced from their respective longitudinal axes will remain in a fixed orientation to enable the concertina type hinge members to hinge across their front faces between operative and inoperative attitudes. The support also relieves such loads from the other said bolted connections.

In relation to the bolted connections it is considered that rigid all-welded head bail structures assume crush loads imparted by heavy beasts to the crush walls because of the relative high rigidity of the head bail compared to the crush. This results in overload of the welded joints and their premature failure.

It is also preferred that one of the support posts provide a lower mounting for the holding means and an upper pivotal mounting for a translation mechanism able to translate pivotal movement of an operating handle thereon to lateral motion of the bail members, the translation mechanism preferably being connected to the upper ends of the bail members which extend between the guide bars.

In a further aspect this invention resides broadly in a method of installing a head bail assembly to an existing race, the method including providing the crush in a knock-down form and bolting the crush components together such that the bolted joints provide moment transfer about respective longitudinal race axes between support posts and post rotational support about post axes through bolted connections, each including bolts spaced from these respective axes. Servicing of such head bail assemblies is also facilitated as parts requiring service may be readily dismantled and sent away for repair.

In another aspect this invention resides in a demountable bail assembly generally of the type described above and utilising any suitable form of holding means such as a ratchet mechanism or a hydraulic mechanism as previously described.

In yet another aspect this invention resides broadly in a holding assembly including:

adjustable holding means;

a locking chamber associated with said adjustable holding means which may be filled with fluid to lock said adjustable holding means;

control means for controlling flow of fluid from said locking chamber, and actuating means for selectively actuating said control means.

Preferably, the adjustable holding means is an extendable hydraulic ram assembly but it may be a rotary hydraulic actuator or other like device.

The locking chamber may be separate to the adjustable holding means and operatively connected to it. Preferably however, the locking chamber is integral with the adjustable holding means.

The control means may be a solenoid or lever controlled gate valve which is closed in the engaged position and is opened to allow movement of the adjustable holding means to the disengaged position. Preferably, the control means is a non-return valve which may be overridden to permit fluid to flow from the locking chamber but which normally operates to admit fluid to the locking chamber and prevent reverse flow therefrom. In one such embodiment there is suitably provided an actuating shaft passing to the non-return valve through the storage chamber.

Preferably the hydraulic holding assembly includes a fluid supply reservoir integral with the adjustable holding means. However, the fluid supply may be a continuous supply such as piped water or oil which is operatively connected to the locking chamber from an external source.

In another aspect this invention resides broadly in a beast restraining assembly including:

restraining means moveable between operative engaged positions and a disengaged position;

low noise holding means for holding said restraining means in an operative engaged position.

The restraining means may be a gate, clamp, cradle or the like but preferably it is a bail assembly adapted to engage the neck of a beast as previously described.

The low noise holding means may be a ratchet and pawl mechanism, screw mechanism or the like suitably housed in a sound attenuation module such as an oil bath or insulated chamber. Preferably, however the holding means is a hydraulic holding assembly as described herein.

BRIEF DESCRIPTION OF THE DRAWINGS

In order that this invention may be more readily understood and put into practical effect reference will now be made to the accompanying drawings which illustrate a preferred embodiment of the invention and wherein.

DESCRIPTION OF THE PREFERRED EMBODIMENT

Figure 1:
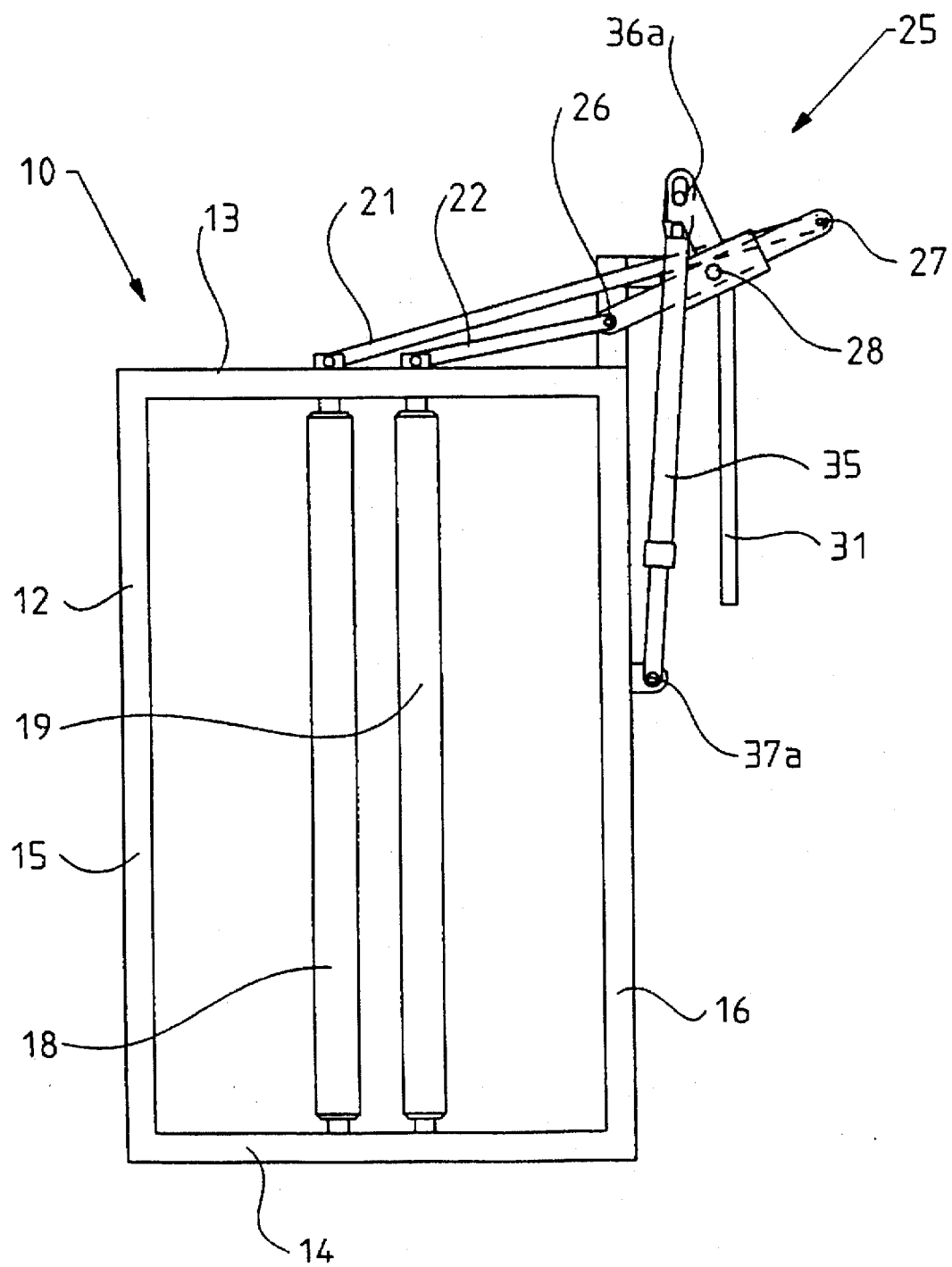
FIG. 1 is a front view of a bail assembly according to the invention adapted to clamp on both sides of a beast's neck.

The bail assembly 10 illustrated in FIG. 1 includes a rectangular frame assembly 12 having opposed top and bottom members 13 and 14 and opposed vertical side members 15 and 16. Head bails 18 and 19 are slideably connected between the top and bottom members 13 and 14 so as to be movable towards and away from the vertical side members 15 and 16.

A yoke assembly 25 is pivotally mounted to an extended portion of the frame member 15 and includes a yoke member 24 having opposed ends 26 and 27 which are linked to the respective upper end portions of the head bails 18 and 19 by link members 21 and 22 such that upon rotation of the yoke assembly about its pivot point 28, the link members move the head bails 18 and 19 inwardly or outwardly so as to be able to clamp on the neck of a beast. A holding arm 29 and a sleeve 30 are loosely fitted around the yoke member 24 and are connected to pivot point 28 so as to allow pivotal movement between the sleeve and the yoke arm. An operating handle 31 is rigidly connected to the sleeve 30.

The bail assembly also includes a hydraulically operated holding assembly 35 pivotally connected at one end to the holding arm 29 of the yoke assembly 25 and at the other end pivotally connected to a mid portion of the frame member 16 through holes 36a and 37a respectively.

The holding assembly 35 includes an outer cylindrical wall 40 having an upper end cap 41 and a piston rod 42 slidably and sealably engaged within the outer cylindrical wall in a lower portion thereof so as to form a fluid chamber between the upper end cap 41 and the piston face of piston rod 42. A 'J' seal 43 is positioned at the piston rod end of the cylinder to prevent the ingress of contaminants such as dust.

A control means 44 is arranged in a mid portion of the chamber so as to divide it into a locking chamber 36 on the piston rod side of the control means 44 and a fluid reservoir 46 on the other side. The control means 44 includes a one-way ball valve 47 arranged to allow fluid flow from the fluid reservoir to the locking chamber but to prevent flow in the reverse direction unless the ball valve 47 is manually held in the open position. For this purpose there is provided a shaft 48 extending at one end through the upper end cap 41 and at the other end slidably engaging with the ball valve 47 so as to be able to move the ball valve to an open position when the shaft 48 is depressed, and wherein fluid may flow from the locking chamber to the reservoir. The upper end of the shaft 48 is encapsulated in a shaft cap 49 attached to the upper end cap 41 to prevent the shaft 48 from becoming disengaged from the ball valve 47. The shaft is maintained in a non-engaged position by a spring 50 located between the shaft cap 49 and the end cap 41.

The shaft 48 may be engaged at its upper end by an engaging portion 31a of the operating handle 31 which is arranged to depress the shaft 48 upon initial pivotal movement of the operating handle about the pivot point 2 thereby opening the ball valve 47.

The fluid reservoir 46 can be charged with fluid through filling cap 51 positioned at an upper end thereof. The filling cap includes a vent to atmosphere which may be closed to prevent ingress of moisture when the hydraulic holding assembly is not in use.

The upper end portion of the outer cylindrical wall 40 is connected to a mounting portion 36 suitably adapted for pivotal connection to the yoke assembly 25 whilst the lower end of piston 42 includes a mounting portion 37 adapted for pivotal connection to the frame member 16.

In use, the head bails 18 and 19 are moved towards the side members 15 and 16 to enable the neck of a beast to be accommodated therebetween. The operating handle 31 is then pivoted to pivot the yoke assembly 25 in a direction causing opposing movement of the link members 21 and 22 which slide the head bails 18 and 19 towards each other wherein they clamp against the neck of the beast.

While the link members 21 and 22 are moving the head bails towards each other the holding arm 29 coincidentally moves the outer cylindrical wall 40 of the hydraulic assembly 35 upwardly thereby extending the holding assembly. As the hydraulic holding assembly 35 begins to extend, the ball valve 47 opens and allows fluid to flow into the locking chamber 36 from the vented reservoir 46 as the holding assembly extends.

As rotation of the yoke member 24 ceases the ball valve 47 closes to prevent fluid returning from the locking chamber to the reservoir so that the yoke assembly cannot be rotated in the reverse direction by movement of the head bails 18 and 19 thereby holding them in any desired engaged position against the neck of the beast.

Figure 2:
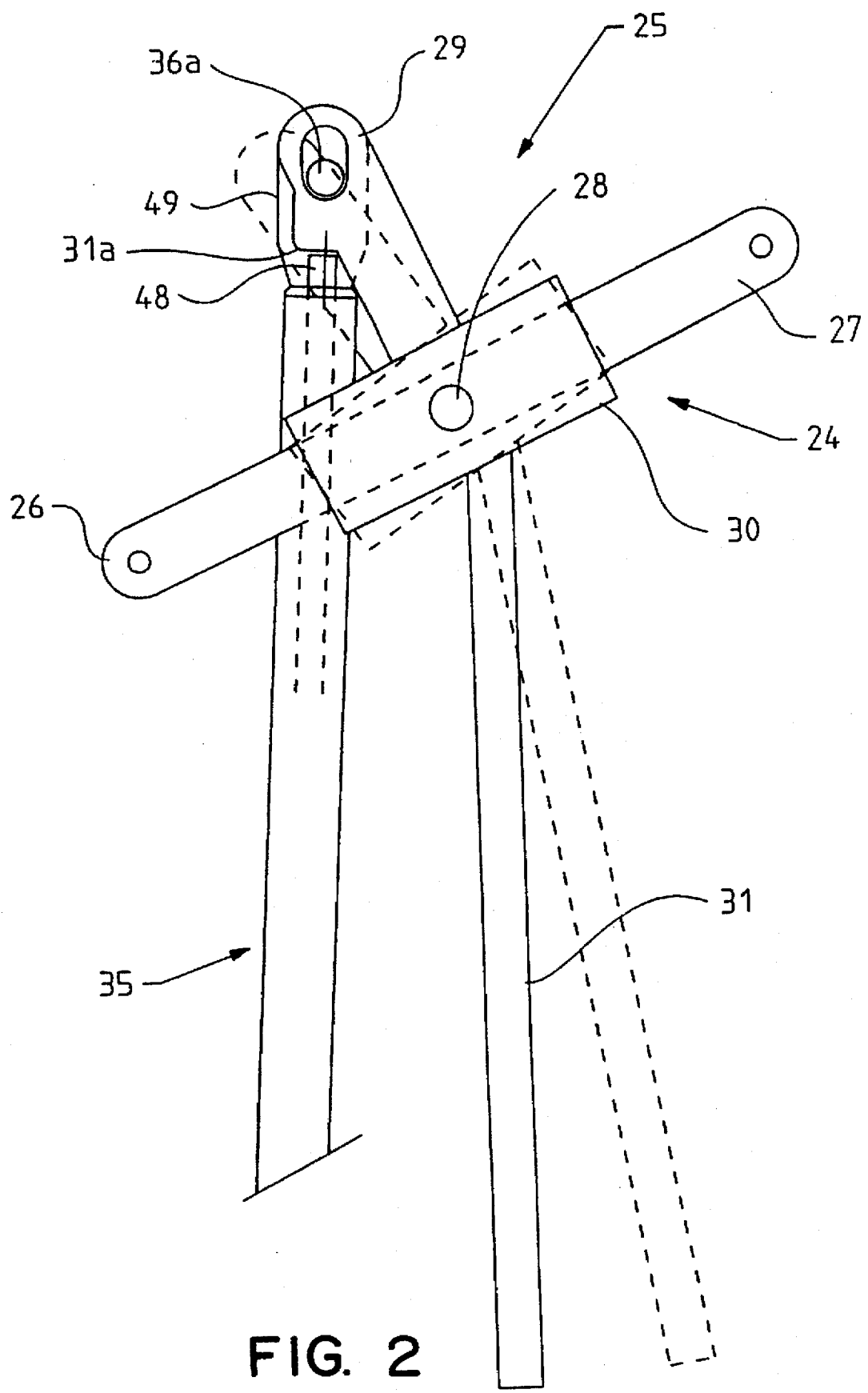
FIG. 2 is an enlarged front view of a yoke assembly adapted to operate the bail assembly of FIG. 1.

To release the beast from the bail assembly, the operating handle 31 is rotated in a reverse direction wherein initially an engaging portion 31a of the operating handle contacts the upper end of shaft 48 and forces it downwardly to open the ball valve 47 so that fluid may return to the reservoir from the locking chamber as illustrated in dashed line in FIG. 2. As the operating handle is forced further in a reverse direction, the yoke 25 pivots and the oil is forced out of the locking chamber by the piston rod 42. Coincidentally the head bails 18 and 19 move apart.

Figure 4:
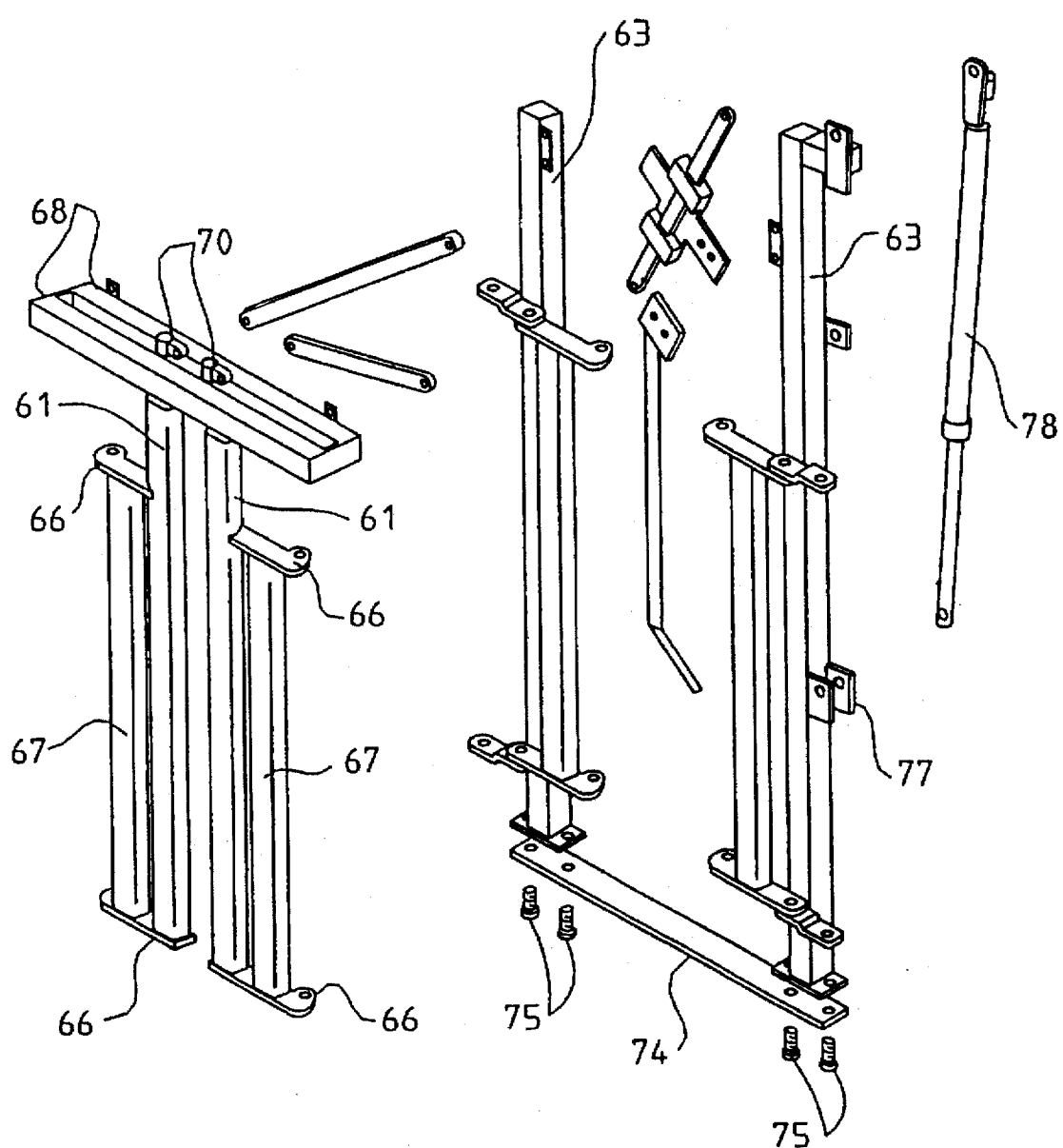
Figure 5:
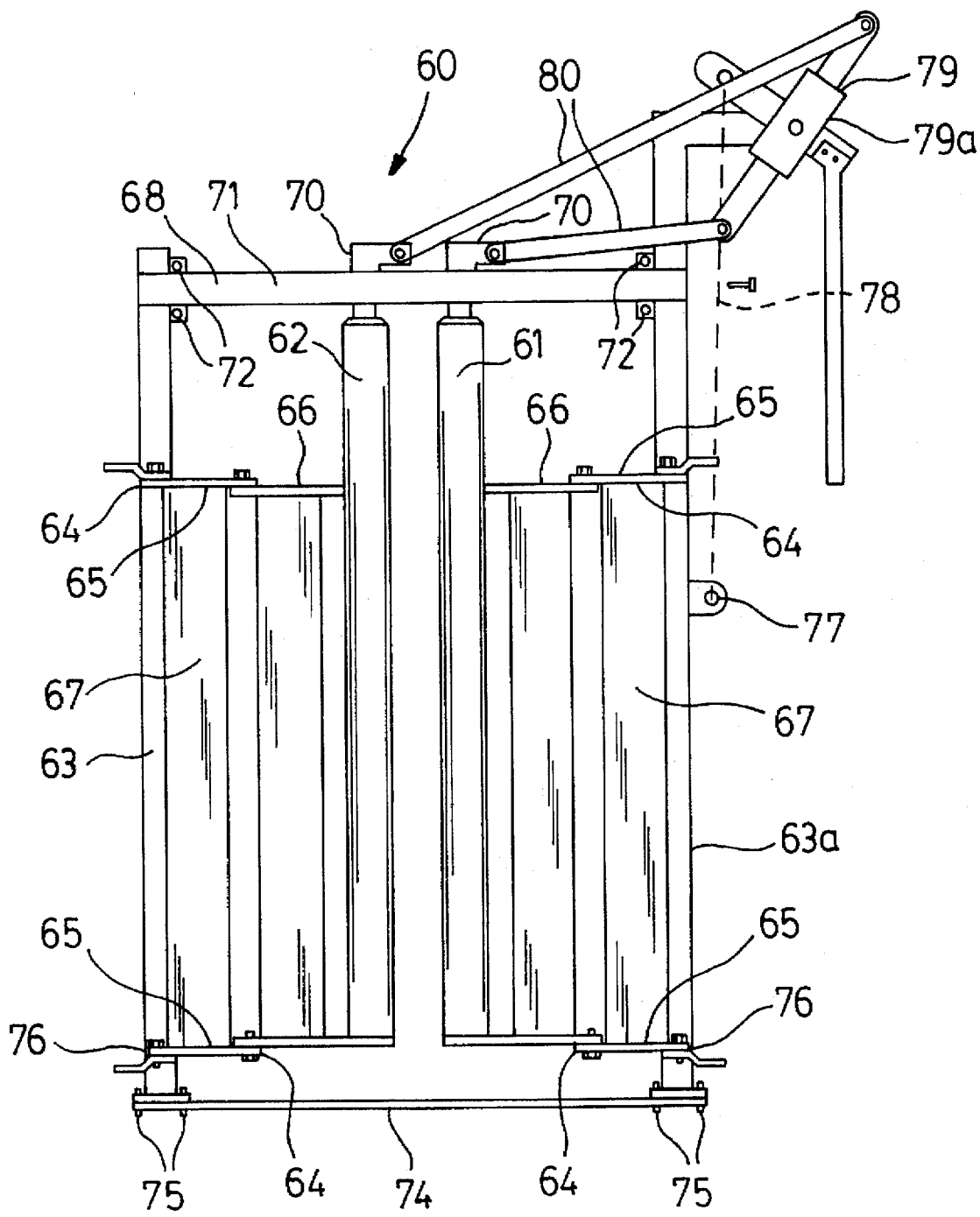

It is preferred that the head bail assembly 60 illustrated in FIGS. 4 and 5 include head bails 61, 62 connected to opposed support posts 63 by concertina type hinge linkages 64. These linkages include respective pairs of straight outer links 65 connected to brackets at the front of the support posts 63 and cranked inner links 66 connected rigidly at their inner ends to the head bails 61, 62. The respective pairs of outer links are rigidly connected to upright members 67 so as to maintain the upper and lower ends of the head bails parallel. As illustrated the hinge links support and guide the head bails for movement between their engaged and disengaged positions, the upper guide members 68 only restraining longitudinal movement of the bail members. Furthermore in their disengaged positions the linkages 65, 66 protrude laterally only a short distance from the outer faces of the support posts 63.

Figure 3:
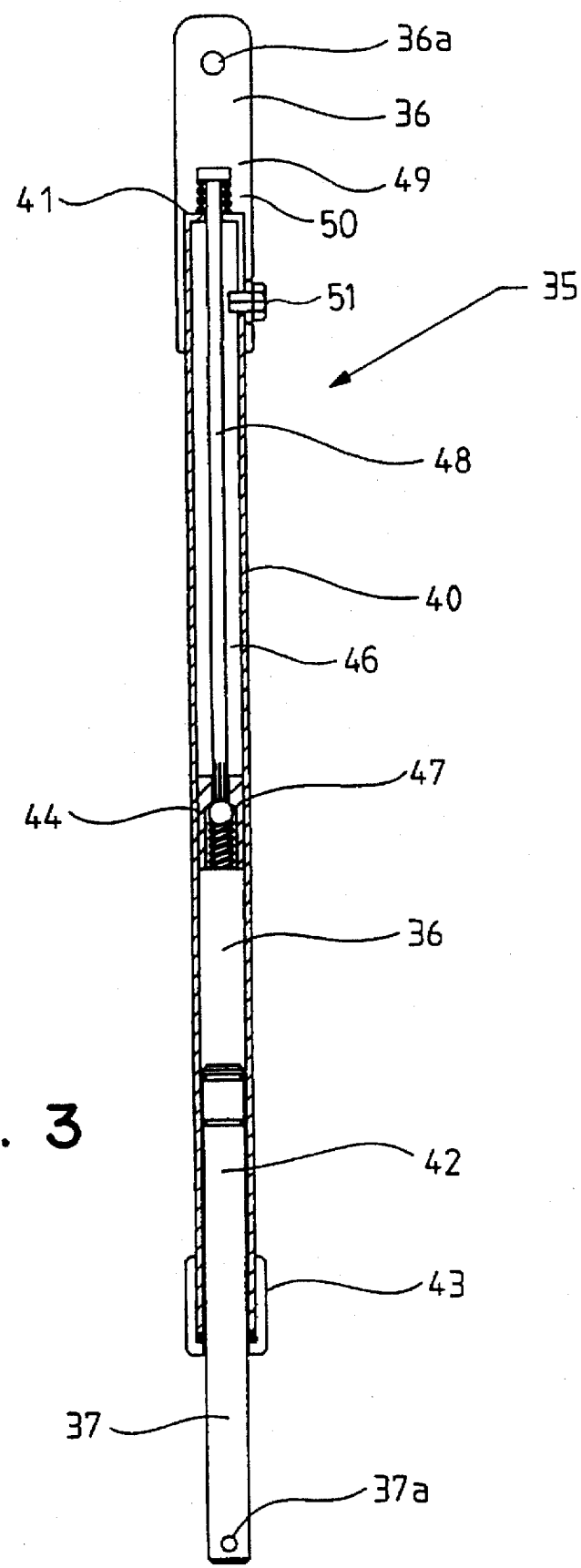
FIG. 3 is a sectional view of the hydraulic holding assembly utilised in the bail assembly of FIG. 1, and FIGS. 4 and 5 illustrate a knock-down form of head bail assembly according to the invention.

It will be appreciated that the bail assembly 60 is demountable for supply in knocked-down form whereby the members of the bail assembly may be packaged into a relatively small package. For this purpose the opposed support posts 63 are rigidly interconnected at their upper ends to longitudinally spaced laterally extending bars 68 which form guides for upward extension 70 of the head bails. The bars 68 have upper and lower bolt connections 72 providing moment transfer about respective longitudinal race axes 71 between the support posts 63. The bottoms 73 of the posts 63 are non-rotatably bolted to a lower bail member 74 by laterally spaced bolts 75 such that hinge pivots 76 extending from the front of the posts 63 remain in a fixed orientation to enable the concertina type hinge members to hinge across their front faces. One support post 63 is provided with a lower mounting 77 for the holding means 78 and an upper pivotal mounting 79a for the translation mechanism 79 which operates the bail link members 80, it being understood that the operation of the bail assembly 60 is by the mechanism described in relation to FIGS. 1 to 3.

In order to maintain ruggedness in the assembled bail assembly in use, the guide bars 68 are pre-assembled as a rigid parallel frame bolted at its outer end to the front face of the posts 63 and the lower bar 74 is a flat bar through bolted through widely spaced pairs of bolt apertures formed on mounting wings welded to the lower ends of the posts 63.

It will of course be realised that the above has been given only by way of illustrative example of the invention and that all such modifications and variations thereto as would be apparent to persons skilled in the art are deemed to fall within the broad scope and ambit of the invention as is defined in the appended claims.

I claim:

1. A bail assembly including:
   bail means moveable from a disengaged position to any desired one of an infinite number of operative engaged positions;
   an operating handle operatively connected to said bail means for rapidly moving said bail means from said disengaged position to said desired engaged position upon movement of the handle generally in one direction, and
   holding means for holding said bail means at said desired engaged position.

2. A bail assembly as claimed in claim 1, wherein the bail means includes a pair of opposed moveable head bail members interconnected for movement towards and away from each other and adapted to engage the neck of a beast.

3. A bail assembly as claimed in claim 1, wherein said holding means is a selectively releasable self locking hydraulic cylinder assembly.

4. A bail assembly as claimed in claim 1, wherein the bail means includes a pair of bail members connected by concertina type hinges to opposed spaced supports which extend upwardly to engage with guide means for guiding opening and closing movement of said bail members between an engaged position and a disengaged position, said guide members being adapted to prevent movement of the bail members in a direction perpendicular to said opening and closing movement.

5. A bail assembly as claimed in claim 4, wherein the bail assembly is demountable for supply in knocked-down form and adapted for bolted interconnection of major structural components.

6. A bail assembly as claimed in claim 5, wherein the members of the bail assembly, when disassembled, package into a relatively small package.

7. A bail assembly as claimed in claim 5, wherein the bail assembly includes a pair of opposed support posts adapted to be rigidly interconnected by transverse members providing moment transfer about respective longitudinal race axes between support posts and post rotational support about post axes through bolted connections, each including bolts spaced from said respective axes.

8. A bail assembly as claimed in claim 7, wherein the moment transfer about respective longitudinal race axes is provided by a transverse structure at upper ends of the posts and the rotational support about post axes is provided by a transverse structure at the lower ends of the posts.

9. A bail assembly as claimed in claim 8, wherein the upper transverse structure is formed by spaced laterally extending bars which form guides for upward extension of the bail members.

10. A method of fitting a head bail assembly as claimed in claim 5 to an existing race including:

providing the head bail assembly in a knock-down form and bolting the components of the heed bail assembly together such that the bolted joints provide moment transfer about respective longitudinal race axes between support posts and post rotational support about post axes, each bolted joint including bolts spaced from said respective axes.

11. A bail assembly including:

bail means movable from a disengaged position to any desired one of an infinite number of operative engaged positions:

an operating handle operatively connected to said bail means for rapidly moving said bail means from said disengaged position to said desired engaged position upon movement of the handle generally in one direction, and hydraulically operated holding means for holding said bail means at said desired engaged position.

12. A bail assembly as claimed in claim 11, wherein the operating handle is adapted to move the bail means to the engaged position upon movement of the handle generally in one direction.

13. A bail assembly as claimed in claim 11, wherein said hydraulically operated holding means includes:

adjustable holding means having a first part movable with respect to a second part;

a locking chamber associated with said adjustable holding means which may be filled to lock said first part in a desired position with respect to said second part;

control means for controlling flow of fluid to and from said locking chamber, and actuating means for selectively actuating said control means.

14. A bail assembly as claimed in claim 13, wherein said adjustable holding means is a hydraulic ram and said locking chamber is a variable volume chamber closed by the piston of said hydraulic ram.

15. A bail assembly as claimed in claim 14, wherein said hydraulic ram includes a storage chamber remote from said locking chamber and said control means is a one-way valve assembly which permits free flow from said storage chamber to said locking chamber, said one-way valve being actuable by said actuating means to selectively permit reverse flow between said storage chamber and said locking chamber.

16. A bail assembly as claimed in claim 15, wherein said valve means is disposed in a closure wall opposing said piston and said actuating means includes a shaft extending through the storage chamber to an external location.

17. A bail assembly as claimed in claim 16, wherein said shaft is adapted for engagement by operating means at said external location.

18. A bail assembly as claimed in claim 13, including release means operatively connected to said operating handle and adapted to engage said actuating means upon movement of said operating handle towards the disengaged position.

19. A bail assembly as claimed in claim 11, wherein the operating handle is connected to said bail means by one or more link members.

* * * * *